United States Patent [19]

Milne

[11] Patent Number: 5,055,670
[45] Date of Patent: Oct. 8, 1991

[54] DOCUMENT SENSING APPARATUS WHICH DETECTS VOLTAGE DROPAGE AND GENERATES A FIRST AND SECOND SIGNAL

[75] Inventor: Douglas L. Milne, Dundee, Scotland

[73] Assignee: NCR Corporation, Dayton, Ohio

[21] Appl. No.: 583,925

[22] Filed: Sep. 17, 1990

[30] Foreign Application Priority Data

Jun. 28, 1990 [GB] United Kingdom ............... 9014407

[51] Int. Cl.$^5$ .............................................. G01N 9/04
[52] U.S. Cl. ........................... 250/223 R; 250/214 R; 226/45
[58] Field of Search ............... 250/221, 222.1, 223 R, 250/561, 214 R; 226/20, 45

[56] References Cited

U.S. PATENT DOCUMENTS

| | | | |
|---|---|---|---|
| 3,488,048 | 1/1970 | Dykaar et al. | 250/223 R |
| 3,906,232 | 9/1975 | Meihofer | 250/341 |
| 4,151,410 | 4/1979 | McMillan et al. | 250/223 R |
| 4,268,746 | 5/1981 | Schroeder | 250/223 R |
| 4,289,406 | 9/1981 | Maddox | 356/429 |
| 4,607,155 | 8/1986 | Nao et al. | 235/379 |
| 4,723,072 | 2/1988 | Naruse | 235/454 |
| 4,892,426 | 1/1990 | Steele | 226/45 |

OTHER PUBLICATIONS

NCR Invention Disclosure Record No. 4472, pp. 2 & 6.

Primary Examiner—David C. Nelms
Assistant Examiner—S. Allen
Attorney, Agent, or Firm—Wilbert Hawk, Jr.; Albert L. Sessler, Jr.

[57] ABSTRACT

A document sensing apparatus includes a phototransistor (12) for generating a first or second voltage depending on whether or not, respectively, a document is present at a sensing location, and a capacitor (36) for providing a second voltage whose peak value is determined by said second value. A voltage comparator (30, 38, 40) compares said first and second voltages and provides an output signal indicative of the presence of a document at the sensing location if said first voltage is less than a predetermined fraction of said second voltage. A microprocessor (44) controls the operation of a circuit (71-1) which provides, as necessary, a charging current to said capacitor (36) so that, while a document is present at the sensing location, said second voltage is prevented from falling by a significant amount, thereby preventing problems occurring if a document remains at the sensing location for a prolonged period due to a feeding irregularity.

21 Claims, 4 Drawing Sheets

DOCUMENT SENSING APPARATUS WHICH DETECTS VOLTAGE DROPAGE AND GENERATES A FIRST AND SECOND SIGNAL

BACKGROUND OF THE INVENTION

This invention relates to an apparatus for sensing the passage of documents past a sensing location.

The invention has application, for example, to a depository apparatus included in an automated teller machine (ATM) of the kind which is arranged to carry out a financial transaction, such as dispensing currency notes or accepting a deposit of money, as may be required by a customer. As is well known, in operation of an ATM of this kind, a user inserts a customer identifying card into the machine and then enters certain data (such as a personal identification number, type of transaction, and quantity of money required or to be paid in) on one or more keyboards included in a user console of the machine. The machine will then process the transaction, dispense currency notes or accept a money deposit as may be requested, and then return the card to the user as part of a routine operation. If money is to be deposited, the user typically inserts an envelope containing the money (cash and/or cheques) through a deposit entry slot in the user console, and the depository apparatus of the ATM transports the envelope to, and deposits it in, a container included in the apparatus. In order for the operation of the depository apparatus to be controlled correctly, it is necessary to provide sensors for sensing the passage of an envelope past certain points, hereinafter referred to as sensing locations, along a transport path for the envelope between the entry slot and the said container. For example, the operation of a printer may be initiated when the training edge of an envelope passes a sensor.

A known apparatus for sensing the passage of documents past a sensing location includes a light responsive device, such as a phototransistor, operably associated with a light emitting device, such as a light emitting diode (LED). The sensing location is defined as the position in the transport path for the documents where the leading edge of a document interrupts the passage of light from the light emitting device to the light responsive device. The light responsive device forms part of voltage generating means the output voltage of which has a first (high) value when a document is not present at the sensing location, that is to say when the passage of light from the light emitting device to the light responsive device is not interrupted by a document, and which has a second (low) value when a document is present at the sensing location, that is to say when such passage of light is interrupted by a document. The output of the voltage generating means is applied to a peak detector formed by a capacitive voltage storage means which provides an output voltage whose peak value is equal to said first value and whose value progressively decreases while a document is present at the sensing location. The apparatus includes voltage comparison means for comparing the output of the voltage generating means with the output of the capacitive voltage storage means and for providing a first or a second output signal indicative of whether or not, respectively, a document is present at the sensing location, depending on whether the output voltage of the voltage generating means is less than or greater than, respectively, a predetermined fraction (e.g. 80%) of the output of the peak detector.

By virtue of the use of the peak detector and the voltage comparison means, the known document sensing apparatus described above has the advantage that it will continue to provide a first (high) signal when a document is not present at the sensing location, even when the output voltage of the voltage generating means with no document present has fallen over time due to dust building up on the light emitting and light responsive devices and/or due to aging of the light emitting device. However, this known apparatus has the disadvantage that if a document is present at the sensing location for an abnormally long time, for example due to a jam occurring, the output of the capacitive voltage storage means may fall to a value such that the voltage comparison means provides a second output signal, falsely indicating that the document has cleared the sensing location.

SUMMARY OF THE INVENTION

According to the invention there is provided an apparatus for sensing the passage of documents past a sensing location and for providing a first or a second output signal indicative of whether or not, respectively, a said document is present at said sensing location, the apparatus comprising voltage generating means for generating a first voltage which has a first, lower, value or a second, higher, value depending on whether or not, respectively, a said document is present at said sensing location; capacitive voltage storage means coupled to the output of said voltage generating means for providing a second voltage whose peak value is determined by said second value and whose value progressively decreases while a document is present at said sensing location; voltage comparison means for comparing said first voltage with said second voltage and for providing said first output signal or said second output signal depending on whether said first voltage is less than or is greater than, respectively, a predetermined fraction of said second voltage; switch means; circuit means coupled to said switch means and arranged to provide a charging current to said capacitive voltage storage means when said switch means is set to an operated condition; and data processing means coupled to said voltage storage means and arranged to control the operation of said switch means so that, while a said document is present at said sensing location, said second voltage is maintained at a magnitude such that said predetermined fraction of said second voltage is greater than said first voltage.

It is an object of the present invention to provide an apparatus for sensing the passage of documents past a sensing location, which apparatus substantially overcomes the above-mentioned disadvantage of the known apparatus referred to above.

BRIEF DESCRIPTION OF THE DRAWINGS

One embodiment of the invention will now be described by way of example with reference to the accompanying drawings, in which.

DETAILED DESCRIPTION

Figure 1A:
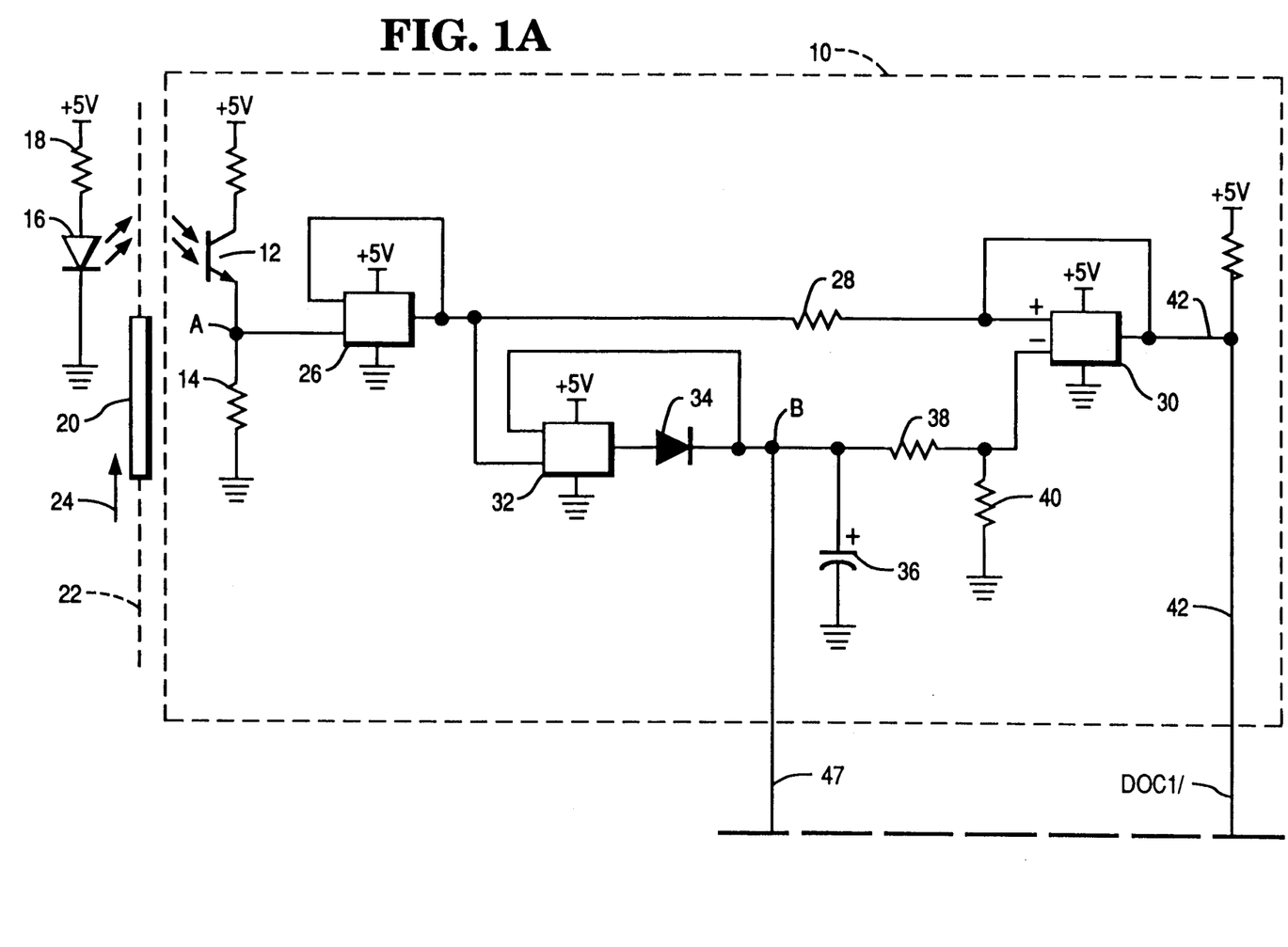
FIGS. 1A and 1B, taken together, constitute a circuit diagram of a document sensing apparatus in accordance with the invention for use in an envelope depository of an ATM.
Figure 1B:
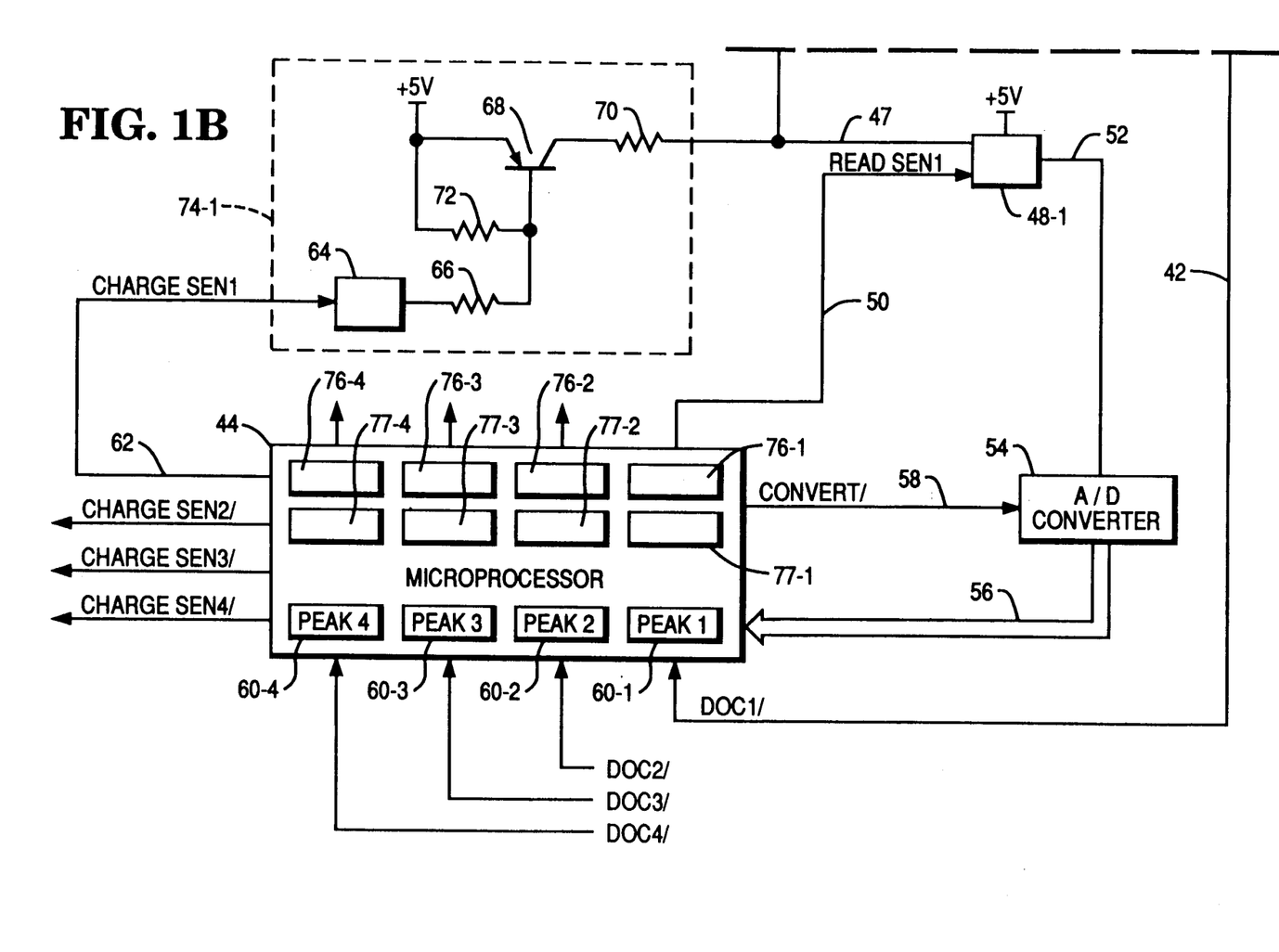

Referring to FIGS. 1A and 1B, the document sensing apparatus shown therein includes a sensor circuit 10 incorporating a phototransistor 12 connected in series with a resistor 14 between a +5V voltage supply and ground. The phototransistor 12 is operably associated with an LED 16 connected in series with a resistor 18 between the +5V supply and ground. Normally, light emitted by the LED 16 is incident upon the phototransistor 12 so that the phototransistor 12 fully conducts, the voltage at the point A on the line of connection between the phototransistor 12 and the resistor 14 being proportional to the value of the current flowing through the resistor 14.

In operation, envelopes such as the envelope 20 shown in FIGS. 1A and 1B pass along a feed path 22 in the direction of the arrow 24 between the LED 16 and the phototransistor 12. When the envelope 20 reaches a sensing location represented by the position at which the leading edge of the envelope 20 intercepts light passing from the LED 16 to the phototransistor 12, the amount of light incident upon the phototransistor 16 suddenly decreases resulting in the phototransistor 16 conducting to a lesser extent and thereby causing a fall in the voltage at the point A. It should be understood that the voltage at the point A is substantially proportional to the intensity of the light which is incident upon the phototransistor 12. While the envelope 20 is present at the sensing location, thereby interrupting the passage of light from the LED 16 to the phototransistor 12, only a relative small amount of light from the LED 16 passes through the envelope 20 so as to be incident upon the phototransistor 12, so that during this time the voltage at the point A remains at a low level.

The point A is connected to the input of a buffer 26, the output of which is connected via a resistor 28 to the positive input of a voltage comparator 30 which is connected as shown in FIGS. 1A and 1B. The output of the buffer 26 is also connected to the input of a further buffer 32. The output of the buffer 32 is connected via a diode 34 to the positive terminal of a capacitor 36, the other terminal of which is connected to ground. The positive terminal of the capacitor 36 is connected to ground via resistors 38 and 40, and the connection between the resistors 38 and 40 is connected to the negative input of the voltage comparator 30. Each of the buffers 26 and 32 has unity gain, so that the voltage appearing at the output of each of the buffers 26 and 32 is equal to the voltage appearing at the point A. The circuit comprising the buffer 32, the diode 34, the capacitor 36 and the resistors 38 and 40 acts as a peak detector, since in normal operation of the sensor circuit 10 the capacitor 36 will be charged to a voltage substantially equal to the peak voltage appearing at the point A, that is to say the voltage which appears at point A when no document is present at the sensing location. It should be understood that the time constant of the RC circuit comprising the capacitor 36 and the resistors 38 and 40 is sufficiently long such that, during the time that an envelope is passing through the sensing location (which is less than 2 seconds), the charge on the capacitor 36 does not fall by a significant amount.

The resistors 38 and 40 serve as a potential divider, the values of the resistors 38 and 40 being chosen such that the voltage applied to the negative input of the voltage comparator 30 is equal to approximately 80% of the voltage stored by the capacitor 36. By virtue of the potential divider 36, 38, when no envelope is present at the sensing location, the voltage appearing at the positive input of the voltage comparator 30 is greater than the voltage appearing at the negative input of the comparator 30, so that the voltage appearing on a line 42 connected to the output of the comparator 30 is at a high level. When an envelope is present at the sensing location, the voltage appearing at the positive input of the comparator 30 will drop, while the voltage appearing at the negative input of the comparator 30 will initially remain substantially unchanged due to the peak detector 32, 34, 36, 38 40. The voltage at the positive input of the comparator 30 will now be less than the voltage at the negative input of the comparator 30, so that a low level signal DOC1/ will appear on the line 42. Thus, it will be appreciated that the appearance of a low level signal DOC1/ on the line 42 is indicative of the presence of an envelope at the sensing location. As previously explained, the comparator 30 and the peak detector 32, 34, 36, 38, 40 ensure that a low level signal DOC1/ on the line 42 will indicate the presence of an envelope at the sensing location even though the voltage appearing at point A when no envelope is present at the sensing location may have fallen appreciably with time due to a build up of dust on the LED 16 and the phototransistor 12 and/or due to aging of the LED 16.

Figure 2:
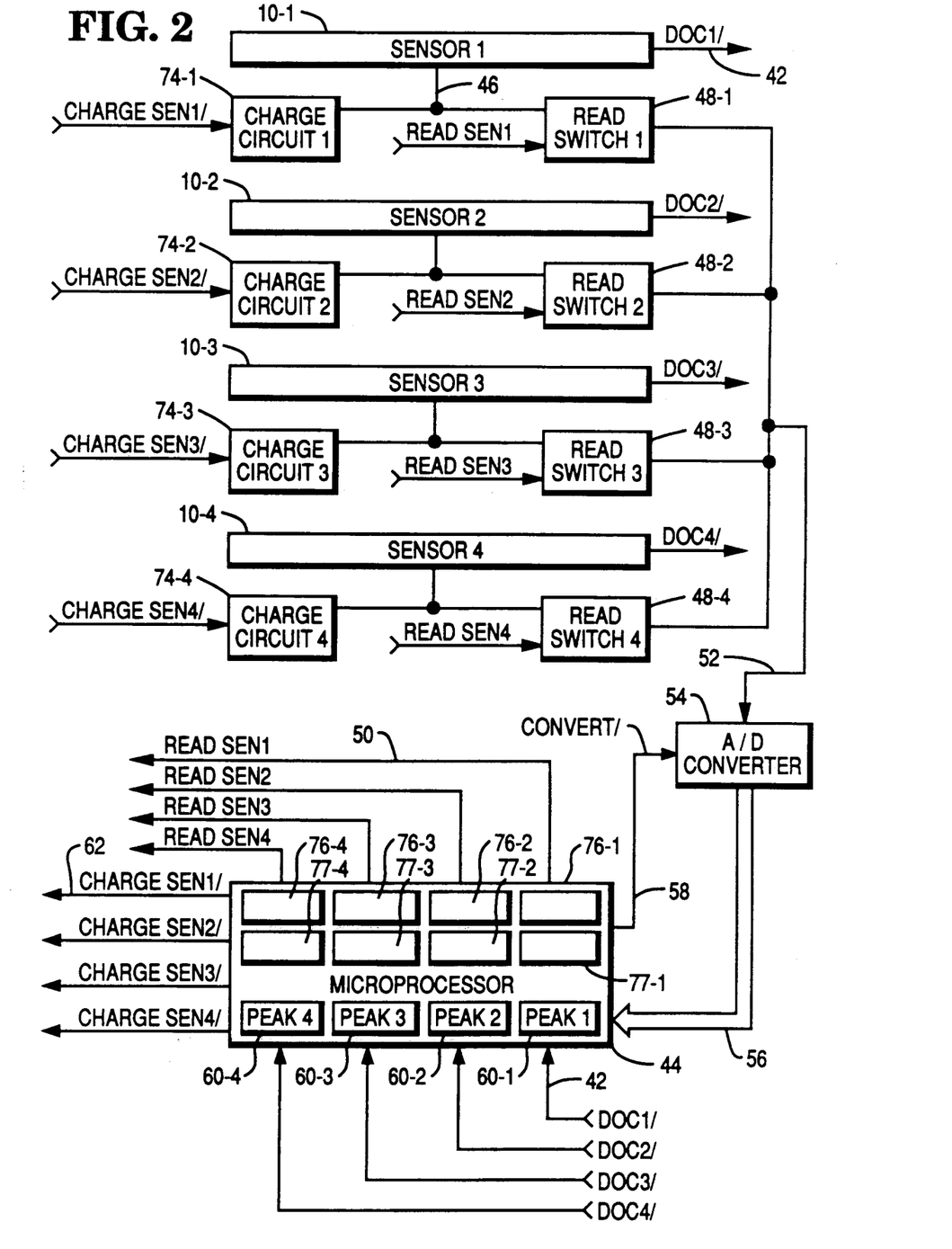
FIG. 2 is a block diagram of the sensing apparatus of FIGS. 1A and 1B showing how a plurality of sensor circuits are associated with a common analog to digital converter.

Referring now also to FIG. 2, the line 42 is connected to a microprocessor 44 which serves to control the operation of an envelope depository 46 (FIG. 3) which includes the sensor circuit 10 (shown with the reference numeral 10-1 in FIG. 2). A point B (FIG. 1A) connected to the positive terminal of the capacitor 36 is connected via a line 47 to one input terminal of an electronic switch 48-1 (FIG. 1B), a second input terminal of the switch 48-1 being connected to the microprocessor 44 via a line 50. Normally, the switch 48-1 acts as an open circuit, but upon a high level signal READ SEN1 being applied by the microprocessor 44 to the switch 48-1 over the line 50, the switch 48-1 closes so as to connect the point B to a line 52 connected to an output terminal of the switch 48-1. The line 52 is connected to an input terminal of an analog to digital (A/D) converter 54 the output of which is connected to the microprocessor 44 over an 8 bit data bus 56. The operation of the A/D converter 54 is such that, with the switch 48-1 closed, when the microprocessor 44 applies a low level signal CONVERT/ to the A/D converter 54 over a line 58, the A/D converter 54 applies to the microprocessor 44 over the bus 56 an 8 bit digital representation of the value of the voltage appearing at the point B. For a purpose which will be explained later, at the time an envelope first reaches the sensing location, such digital representation is stored in a storage location 60-1 of the microprocessor 44.

A line 62 connected to the microprocessor 44 is connected to the input of a driver buffer 64 the output of which is connected via a resistor 66 to the base electrode of a transistor 68. The transistor 68 is connected in series with a resistor 70 between the point B and a +5V voltage supply, the base electrode of the transistor 68 being connected to the +5V voltage supply via a further resistor 72. Normally, the voltage on the line 62 is held at a high level, and the transistor 68 is held non-conducting by virtue of a high level signal appearing at the output of the driver buffer 64. In response to the microprocessor 44 applying a low level signal CHARGE SEN1/ to the driver buffer 64 over the line 62, the output of the driver buffer 64 goes low thereby rendering the transistor 68 conducting. Upon the transistor 68 being rendered conducting, there is provided a source of charging current for the capacitor 36 from the +5V voltage supply via the resistor 70. Thus, the circuit comprising the driver buffer 64, the transistor 68 and the resistors 66, 70 and 72 serves as a charging circuit 74-1 with the transistor 68 acting as a switch. In the event of the charge on the capacitor 36 having fallen below its peak value by more than a predetermined amount, the charging circuit 74-1 recharges the capacitor 36 to its peak value in response to a low level signal CHARGE SEN1/ being applied by the microprocessor 44 to the line 62.

The operation of the sensor circuit 10 will now be described with reference to the sensing of the envelope 20 by the sensor circuit 10. Immediately prior to the envelope 20 reaching the sensing location, the voltage on the output line 42 of the comparator 30 is at a high level, the capacitor 36 is charged to the voltage appearing at the point A, the electronic switch 48-1 is open, and the transistor 68 is in a non-conducting condition. Upon the leading edge of the envelope 20 reaching the sensing location, the envelope 20 interrupts the passage of light from the LED 16 to the transistor 12, thereby causing a fall in the voltage appearing at the point A which in turn causes the comparator 30 to generate a low level signal DOC1/ on the line 42. At the same time, a flag is set in a storage location 76-1 in the microprocessor 44 to indicate that the passage of light from the LED 16 to the sensor circuit 10 has been interrupted. The signal DOC1/ is applied to the microprocessor 44, and upon receipt of this signal the microprocessor 44 applies a low level signal CONVERT/ to the A/D converter 54 over the line 58, and applies a high level signal READ SEN1 to the electronic switch 48-1 over the line 50 so as to close the switch 48-1. Upon receipt of the signal CONVERT/, the A/D converter 54 applies to the microprocessor 44 over the bus 56 an 8 bit digital representation of the value of the voltage appearing at the point B, this digital value being stored by the microprocessor 44 in memory location 60-1. Immediately after the just-mentioned digital value (which represents the peak value of the voltage appearing at point A) has been stored in memory location 60-1, the microprocessor 44 returns the voltages appearing on the lines 50 and 58 to their inactive low and high levels respectively.

As previously mentioned, in normal operation the envelope 20 passes through the sensing location in less than 2 seconds, at the end of which time the signal on the line 42 returns to its high level, and the microprocessor 44 will set the value in storage location 60-1 to zero and will clear the relevant flag in the storage location 76-1. If, due to a jam or some other irregularity in the feeding of the envelope 20 along the feed path 22, the low level signal DOC1/ is still present on the line 42 after 2 seconds from its initiation, the microprocessor 44 again applies signals READ SEN1 and CONVERT/ to the electronic switch 48-1 and the A/D converter 54 respectively. As a result of these signals, the A/D converter 54 applies to the microprocessor 44 over the bus 56 a digital representation of the value of the voltage now appearing at the point B. The microprocessor 44 compares this new digital value with the peak value stored in memory location 60-1, and if the new value is less than a predetermined percentage (90% in the present embodiment) of the peak value stored in memory location 60-1, the microprocessor 44 applies a low signal CHARGE SEN1/ to the driver buffer 64 over the line 62, thereby rendering the transistor 68 conducting so as to cause a charging current to flow to the capacitor 36. Immediately after the value comparison has taken place, the signals READ SEN1 and CONVERT/ are terminated, but after a further 100 milliseconds from the last initiation of these signals the signals READ SEN1 and CONVERT/ are again initiated, and the microprocessor 44 makes a further comparison of the new digital value representative of the voltage presently appearing at point B with the peak value stored in memory location 60-1. If the new digital value has reached the stored peak value then the microprocessor 44 will terminate the signal CHARGE SEN1/ so as to terminate the charging of the capacitor 36. If the new digital value is less than the peak value, the microprocessor 44 will maintain the signal CHARGE SEN1/ on the line 62 so that charging of the capacitor 36 continues. For so long as the digital value representative of the voltage appearing at point B remains less than the peak digital value stored in memory location 60-1 while the signal DOC1/ remains present on the line 42, indicating that the envelope 20 is still present at the sensing location, the microprocessor 44 will maintain the signal CHARGE SEN1/ on the line 62 and will compare at 100 microsecond intervals the digital value of the voltage appearing at point B with the stored peak digital. If, as a result of a comparison, the microprocessor 44 finds that the present digital value is no longer less than the stored peak digital value, then the microprocessor 44 will terminate the signal CHARGE SEN1/ so as to terminate the charging of the capacitor 36. After a further 2 seconds, if the signal DOC1/ is still present on the line 42, then a further value comparison sequence, as just described, (which may involve charging of the capacitor 36) will be initiated.

Value comparison sequences will continue to be initiated, with a 2 second interval between successive sequences, for as long as the signal DOC1/ remains present on the line 42. It will be appreciated that the microprocessor 44 ensures that for so long as the envelope 20 is present at the sensing location, the voltage at point B is maintained at a magnitude such that 80% of this voltage is greater than the voltage at point A, thereby ensuring that the signal DOC1/ correctly appears on the line 42 during this period. As soon as the signal DOC1/ terminates in response to the envelope ceasing to be present at the sensing location, whether after 2 seconds in the case of normal feeding or after a longer period due to a feeding irregularity, the microprocessor 44 will set the value in storage location 60-1 to zero, will clear the relevant flag in the storage location 76-1, and will terminate any charging of the capacitor 36 that may be taking place. The microprocessor 44 is now in a condition ready for the next envelope to reach the sensing location. When the next envelope reaches the sensing location, a further signal DOC1/ is generated on the line 42, and the sequence of operations described above is repeated.

It should be understood that an envelope depository of an ATM could employ a plurality of sensor circuits as described thereinbefore with reference to FIGS. 1A and 1B, but with only one A/D converter. Thus, referring to FIG. 2, there are shown therein four sensor circuits 10-1, 10-2, 10-3, and 10-4, each of which is associated with a respective electronic switch 48-1, 48-2, 48-3 or 48-4 and a respective charge circuit 74-1, 74-2, 74-3 or 74-1, as shown. The outputs of the switches 48-1, 48-2, 43-3 and 48-4 are all connected via the line 52 to the A/D converter 54. Each of the sensor circuits 10-1, 10-2, 10-3 and 10-4 generates a respective low level signal DOC1/, DOC2/, DOC3/ or DOC4/ at its output when an envelope is present at the associated sensing location, the signals DOC1/, DOC2/, DOC3/ and DOC4/ all being applied to the microprocessor 44. In addition to the storage location 60-1 previously mentioned, the microprocessor 44 has storage locations 60-2, 60-3 and 60-4. Each of the storage locations 60-2, 60-3 and 60-4 is arranged to store a digital representation of the peak voltage to which the capacitor 36 of the respective sensor circuit 10-2, 10-3 or 10-4 is charged. In a similar manner to hat in which the operations of the switch 48-1 and charge circuit 74-1 are controlled, the operations of the switches 48-2, 48-3 and 48-4 and the charge circuits 74-2, 74-3 and 74-4 are controlled by signals READ SEN2, READ SEN3 and READ SEN4 and CHARGE SEN2/, CHARGE SEN3/ and CHARGE SEN4/ generated by the microprocessor 44. It should be understood that each time a low level signal DOC1/, DOC2/, DOC3/ or DOC4/ is generated in response to an envelope reaching the correspondence sensing location and blocking light from the associated LED, a respective flag is set in the microprocessor 44 in a corresponding storage location 76-1, 76-2, 76-3 or 76-4, this flag being cleared as soon as the envelope ceases to be present at the sensing location.

The microprocessor 44 includes further storage locations 77-1, 77-2, 77-3 and 77-4 in which are stored predetermined digital values representative of the optimum peak values of the voltages at point A of the sensor circuits 10-1, 10-2, 10-3 and 10-4 when the phototransistor 12 and the LED 16 of each of these circuits have optimum performances, that is to say before any aging or build up of dust or dirt on these devices has taken place. Periodically, the microprocessor 44 compares the peak values stored in memory locations 60-1, 60-2, 60-3 and 60-4 with the corresponding optimum values stored in memory locations 77-1, 77-2, 77-3 and 77-4. If the microprocessor 44 finds that the peak value stored in one of the memory locations 60-1, 60-2, 60-3 and 60-4 has fallen below the stored optimum value by more than a predetermined amount, then the microprocessor 44 provides a "state of health" warning signal in respect of the relevant sensor circuit 10-1, 10-2, 10-3 or 10-4 and the associated LED 16. Such "state of health" signals provide advance warnings of possible sensor failure, and enable appropriate servicing to be carried out prior to such failure occurring.

It should be noted that memory locations 60-1, 60-2, 60-3 and 60-4 are non-volatile memories. If a power failure occurs while an envelope is present at a sensing location, then upon power being restored the peak value will still be present in the relevant memory location, but the capacitor 36 of the relevant sensor circuit will be in a discharged condition. The microprocessor 44 is programmed so that when the power is restored the microprocessor 44 checks whether one or more of the flags in the storage locations 76-1, 76-2, 76-3 and 76-4, indicative of the presence of an envelope at a sensing location, has been set. For any one of the sensor circuits 10-1, 10-2, 10-3 and 10-4 for which the relevant flag is found to be set, the microprocessor 44 will cause a charging current to flow to the relevant capacitor 36 in the manner previously described. The microprocessor 44 will cause this charging current to be maintained until such time as the voltage at point B has reached a value equal to the value stored in the relevant storage location 60-1, 60-2, 60-3 or 60-4, the microprocessor 44 comparing these values at 100 millisecond intervals in the manner previously described. When the voltage at point B has been restored to the peak value, a low signal DOC1/, DOC2/, DOC3/ or DOC4/ will correctly appear at the output of the relevant sensor circuit if an envelope is present at this time at the corresponding sensing location. It should be noted that, if the charging circuits 74-1, 74-2, 74-3 and 74-4 were not provided, then, if a power failure occurred while an envelope was present at a sensing location, a high signal would incorrectly appear at the output of the relevant sensor circuit, following power restoration, in the case of the envelope remaining stationary at the sensing location due to a feeding irregularity.

Figure 3:
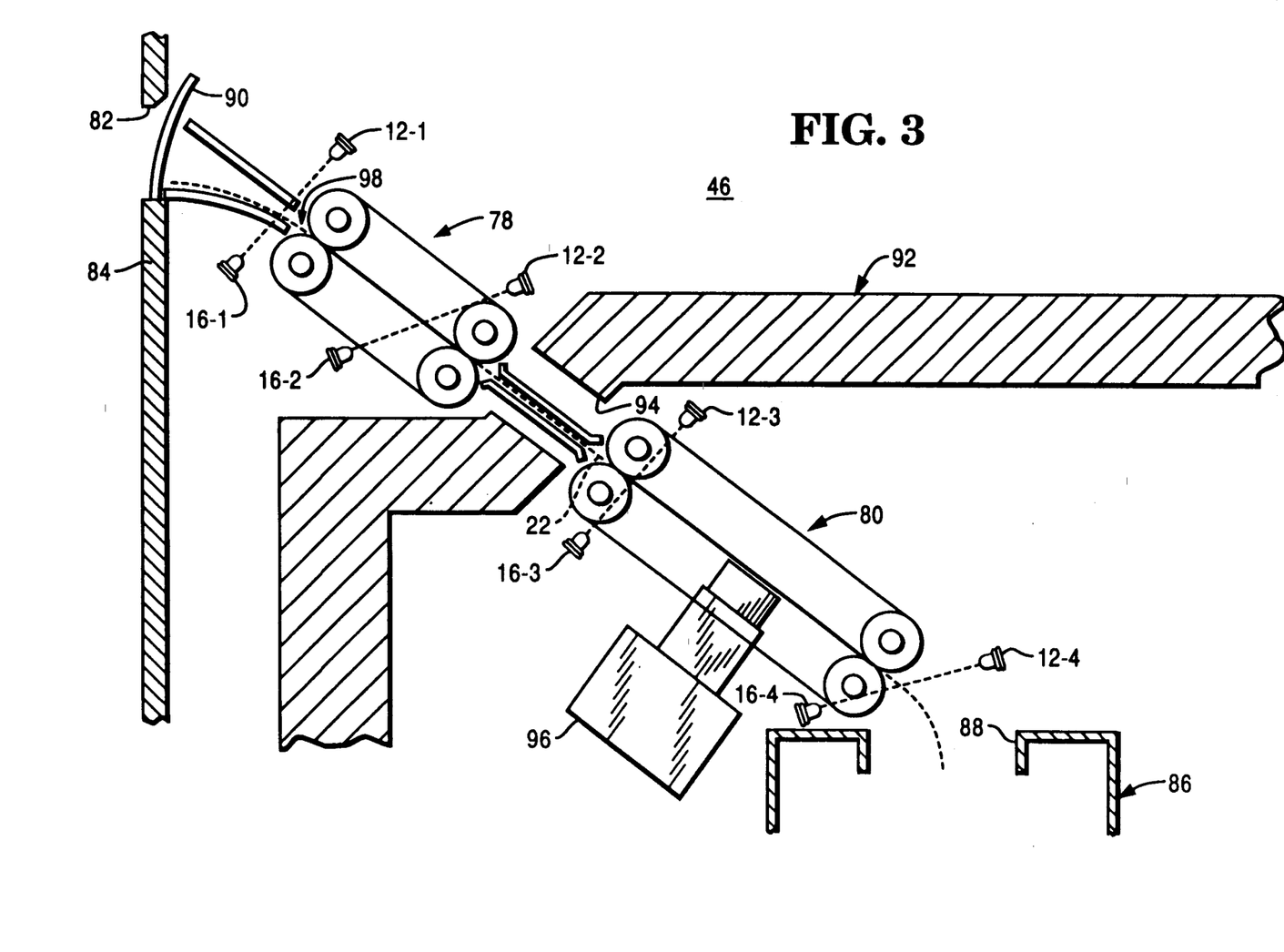
FIG. 3 is a schematic, part sectional, side elevational view of part of an envelope depository including a plurality of document sensors in accordance with the invention.

Referring now particularly to FIG. 3, there is shown therein part of an envelope depository 46 including four phototransistors 12-1, 12-2, 12-3 and 12-4 respectively cooperatively associated with four LEDs 16-1, 16-2, 16-3, and 16-4. The phototransistors 12-1, 12-2, 12-3 and 12-4 correspond to the phototransistor 12 of FIG. 1 and are respectively included in the sensor circuits 10-1, 10-2, 10-3 and 10-4 of FIG. 2, and each of the LEDs 16-1, 16-2, 16-3 and 16-4 corresponds to the LED 16 of FIG. 1.

The depository 46 includes first and second belt transport mechanisms 78 and 80 for transporting envelopes one by one from an entry slot 82 in a front wall 84 of the depository 46 into a depository bin 86 via an opening 88 in the top thereof. The entry slot 82 is normally closed by a shutter 90 operated by a solenoid (not shown). The depository bin 86 is mounted in a safe 92, and in operation envelopes pass along the feed path 22 through an opening 94 in the safe 92. The progress of each envelope along the feed path 22 is monitored by the sensor circuits including the phototransistors 12-1, 12-2, 12-3 and 12-4 as will be described in more detail later. While each envelope is passing along the feed path 22, an ink jet printer 96 prints on the envelope information such as a sequence number, time of deposit and audit information. As is well known, the transport mechanisms 78 and 80 incorporate resilient mountings so as to enable envelopes of different thicknesses to be fed thereby.

The operation of the envelope depository 46 will now be described. In response to a customer requesting a deposit transaction by entering appropriate data on a keyboard (not shown) associated with the depository 46, the microprocessor 44 energizes the shutter solenoid so as to open the shutter 90, and causes the motor (not shown) for driving the transport mechanisms 78 and 80 to commence operation. The customer then inserts an envelope containing money, with a short edge of the envelope leading, through the entry slot 82 until the leading edge of the envelope reaches the nip 98 of the transport mechanism 78, whereupon the envelope is gripped by the transport mechanism 78 and fed along the feed path 22 away from the entry slot 82. Prior to the leading edge of the envelope reaching the nip 98, this edge is sensed by the sensor comprising the phototransistor 12-1 and the LED 16-1, thereby causing the sensor circuit 10-1 to generate a signal DOC1/ . There-after, but prior to reaching the opening 94 in the safe 92, the leading edge of the envelope is sensed by the sensor comprising the phototransistor 12-2 and the LED 16-2, thereby causing the sensor circuit 10-2 to generate a signal DOC2/. Shortly after the envelope has been fully entered through the entry slot 82, the sensor 12-1, 16-1 ceases to sense the envelope (ie. the envelope ceases to interrupt the passage of light from the LED 16-1 to the phototransistor 12-1), so that the signal DOC1/ terminates, while at this time the signal DOC2/ is still present. It should be understood that the sensors 12-1, 16-1 and 12-2, 16-2 provide a security feature, since if the customer were to withdraw the envelope prior to the envelope being fully entered thorough the entry slot 82, such withdrawal would be recognized and recorded by the microprocessor 44 in consequence of the signals DOC1/ and DOC2/ not being generated and terminated in the correct sequence.

As the envelope enters the safe 92 through the opening 94, the leading edge of the envelope is gripped by the transport mechanism 80, and this edge is sensed by the sensor comprising the phototransistor 12-3 and the LED 16-3. At this time, the envelope is still sensed by the sensor 12-2, 16-2 so that the signal DOC2/ still appears at the output of the sensor circuit 10-2. Shortly after the leading edge of the envelope has reached the printer 96, the signal DOC2/ terminates, and in response to the termination of the signal DOC2/ the microprocessor 44 initiates the operation of the printer 96. The spacing between the sensors 12-3, 16-3 and 12-2, 16-2 is such that the leading edge of the envelope is at least 20 millimeters past the operating portion of the printer 96 at the time the operation of the printer 96 is initiated. The printing of information on the envelope by the printer 96 is completed while the envelope continues to be moved along the feed path 22 by the transport mechanism 80. While the printing of information on the envelope is taking place, the leading edge of the envelope is sensed by the sensor comprising the phototransistor 12-4 and the LED 16-4, thereby causing the signal DOC4/ to be generated at the output of the sensor circuit 10-4. Shortly after the commencement of the signal DOC4/, the leading edge of the envelope enters the depository bin 86 via the opening 88. Termination of the signal DOC4/ will indicate to the microprocessor 44 that the envelope has fully entered the bin 86, and the microprocessor 44 will then terminate the operation of the transport mechanisms 78 and 80 and will cause the shutter 90 to close by de-energizing the shutter solenoid. If the signal DOC4/ remains present at the output of the sensor circuit 10-4 for a prolonged period, this is likely to signify that the bin 86 is full, and accordingly the microprocessor 44 provides an output signal indicating that the bin 86 requires emptying or replacement by an empty bin. If any of the signals DOC1/, DOC2/ and DOC3/ remains present for a prolonged period, this is likely to signify that the envelope has become jammed at some point along the feed path 22, and accordingly the microprocessor provides an output signal indicating that a jam has occurred.

The sensors 12-1, 16-1; 12-2, 16-2; 12-3, 1-63; and 12-4, 16-4 are so spaced that, for the shortest permissible envelope, from the time the signal DOC1/ is generated in the course of a deposit operation until the signal DOC4/ is terminated, the envelope will be sensed by at least one of these sensors. The sequence of initiation and termination of the signals DOC1/, DOC2/, DOC3/ and DOC4/ must follow a predetermined pattern for a legal deposit to be made. This arrangement prevents fraud occurring as a result of a customer pulling back an envelope from the depository at any time prior to the envelope fully entering the depository bin 86, for example by attaching a string or thread to the trailing edge of the envelope.

It should be understood that a document sensing apparatus in accordance with the present invention could be utilized in a document handling apparatus other than an envelope depository. For example, such document sensing apparatus could be used for sensing the passage of currency notes in a cash dispensing machine. When used in a cash dispensing mechanism in which normally a plurality of currency notes are dispensed in rapid succession in response to a cash withdrawal request, it is not necessary for the microprocessor 44 of a sensing apparatus in accordance with the invention to store a peak value each time a currency note reaches a sensing location. Instead, the peak value is stored when the first currency note is sensed by a particular sensor in the course of a cash dispensing operation.

What is claimed is:

1. Apparatus for sensing the passage of documents past a sensing location and for providing a first or a second output signal indicative of whether or not, respectively, a said document is present at said sensing location, the apparatus comprising:

voltage generating means for generating a first voltage which has a first, lower, value or a second, higher, value depending on whether or not, respectively, a said document is present at said sensing location;

capacitive voltage storage means coupled to the output of said voltage generating means for providing a second voltage whose peak value is determined by said second value and whose value progressively decreases while a document is present at said sensing location;

voltage comparison means for comparing said first voltage with said second voltage and for providing said first output signal or said second output signal depending on whether said first voltage is less than or is greater than, respectively, a predetermined fraction of said second voltage;

switch means;

circuit means coupled to said switch means and arranged to provide a charging current to said capacitive voltage storage means when said switch means is set to an operated condition; and data processing means coupled to said voltage storage means and arranged to control the operation of said switch means so that, while a said document is present at said sensing location, said second voltage is maintained at a magnitude such that said predetermined fraction of said second voltage is greater than said first voltage.

2. The apparatus of claim 1, in which said data processing means is connected to the output of said voltage comparison means, and is arranged to store a digital representation of the peak value of said second voltage and to compare this stored value with a digital representation of the present value of said second voltage a first predetermined time interval after the generation of said first output signal if at this time this output signal is still present, said data processing means being arranged, as a result of such comparison, to set said switch means to an operated condition for the purpose of charging said capacitive voltage storage means if said digital representation of said present value is less than a predetermined fraction of the stored peak value.

3. The apparatus of claim 2 in which said first predetermined time interval is so chosen as to be greater than the time taken for a document to move past said sensing location in normal operation of said apparatus.

4. The apparatus of claim 2, in which said data processing means is so arranged that, after said first predetermined time interval, for so long as said first output signal is present, said data processing means compares a digital representation of the value of said second voltage with the stored peak value at predetermined second time intervals, less than said first time interval, and sets said switch means to, or maintains said switch means in, an operated condition each time said data processing means finds that the present value of said second voltage is less than a predetermined ratio of the stored peak value.

5. The apparatus of claim 3, in which said data processing means is so arranged that, after said first predetermined time interval, for so long as said first output signal is present, said data processing means compares a digital representation of the value of said second voltage with the stored peak value at predetermined second time intervals, less than said first time interval, and sets said switch means to, or maintains said switch means in, an operated condition each time said data processing means finds that the present value of said second voltage is less than a predetermined ratio of the stored peak value.

6. The apparatus of claim 2, in which, in response to the generation of said first output signal, said data processing means is arranged to set a flag in a storage location, and in which, following a restoration of power to said apparatus after a loss of power thereto, said data processing means is arranged to check if said flag is present and, if it is, is arranged to cause said circuit means to provide a charging current to said capacitive voltage storage means until the digital representation of said second voltage is not less than a predetermined ratio of the stored peak value.

7. The apparatus of claim 4, in which, in response to the generation of said first output signal, said data processing means is arranged to set a flag in a storage location, and in which, following a restoration of power to said apparatus after a loss of power thereto, said data processing means is arranged to check if said flag is present and, if it is, is arranged to cause said circuit means to provide a charging current to said capacitive voltage storage means until the digital representation of said second voltage is not less than a predetermined ratio of the stored peak value.

8. The apparatus of claim 3, in which, in response to the generation of said first output signal, said data processing means is arranged to set a flag in a storage location, and in which, following a restoration of power to said apparatus after a loss of power thereto, said data processing means is arranged to check if said flag is present and, if it is, is arranged to cause said circuit means to provide a charging current to said capacitive voltage storage means until the digital representation of said second voltage is not less than a predetermined ratio of the stored peak value.

9. The apparatus of claim 5, in which, in response to the generation of said first output signal, said data processing means is arranged to set a flag in a storage location, and in which, following a restoration of power to said apparatus after a loss of power thereto, said data processing means is arranged to check if said flag is present and, if it is, is arranged to cause said circuit means to provide a charging current to said capacitive voltage storage means until the digital representation of said second voltage is not less than a predetermined ratio of the stored peak value.

10. The apparatus of claim 2, in which said data processing means is arranged to compare periodically the stored peak value with a stored predetermined digital value and, in response to such comparison, to output a warning signal if the stored peak value is less than stored predetermined digital value by more than a predetermined amount.

11. The apparatus of claim 3, in which said data processing means is arranged to compare periodically the stored peak value with a stored predetermined digital value and, in response to such comparison, to output a warning signal if the stored peak value is less than said stored predetermined digital value by more than a predetermined amount.

12. The apparatus of claim 4, in which said data processing means is arranged to compare periodically the stored peak value with a stored predetermined digital value and, in response to such comparison, to output a warning signal if the stored peak value is less than said stored predetermined digital value by more than a predetermined amount 13. The apparatus of claim 5, in which said data processing means is arranged to compare periodically the stored peak value with a stored predetermined digital value and, in response to such comparison, to output a warning signal if the stored peak value is less than said stored predetermined digital value by more than a predetermined amount.

14. The apparatus of claim 2, also including electronic switch means and an A/D converter, and in which said capacitive voltage storage means is connected to the input of said A/D converter via said electronic switch means, the output of said A/D converter being connected to said data processing means, and in which, for each comparison of the stored peak value with the present value of said second voltage that takes place, said data processing means is arranged to close said electronic switch means, and to cause said A/D converter to apply to said data processing means a digital representation of the voltage appearing at the input of the A/D converter by applying a control signal to said A/D converter.

15. The apparatus of claim 3, also including electronic switch means and an A/D converter, and in which said capacitive voltage storage means is connected to the input of said A/D converter via said electronic switch means, the output of said A/D converter being connected to said data processing means, and in which, for each comparison of the stored peak value with the present value of said second voltage that takes place, said data processing means is arranged to close said electronic switch means, and to cause said A/D converter to apply to said data processing means a digital representation of the voltage appearing at the input of the A/D converter by applying a control signal to said A/D converter.

16. The apparatus of claim 4, also including electronic switch means and an A/D converter, and in which said capacitive voltage storage means is connected to the input of said A/D converter via said electronic switch means, the output of said A/D converter being connected to said data processing means, and in which, for each comparison of the stored peak value with the present value of said second voltage that takes place, said data processing means is arranged to close said electronic switch means, and to cause said A/D converter to apply to said data processing means a digital representation of the voltage appearing at the input of the A/D converter by applying a control signal to said A/D converter.

17. The apparatus of claim 5, also including electronic switch means and an A/D converter, and in which said capacitive voltage storage means is connected to the input of said A/D converter via said electronic switch means, the output of said A/D converter being connected to said data processing means, and in which, for each comparison of the stored peak value with the present value of said second voltage that takes place, said data processing means is arranged to close said electronic switch means, and to cause said A/D converter to apply to said data processing means a digital representation of the voltage appearing at the input of the A/D converter by applying a control signal to said A/D converter.

18. The apparatus of claim 14, also including transport means for transporting documents past a plurality of sensing locations and further including a plurality of sensing apparatuses for sensing the passage of documents past each sensing location, and in which each of the sensing apparatuses employs a common data processing means and a common A/D converter.

19. The apparatus of claim 15, also including transport means for transporting documents past a plurality of sensing locations and further including a plurality of sensing apparatuses for sensing the passage of documents past each sensing location, and in which each of the sensing apparatuses employs a common data processing means and a common A/D converter.

20. The apparatus of claim 16, also including transport means for transporting documents past a plurality of sensing locations and further including a plurality of sensing apparatuses for sensing the passage of documents past each sensing location, and in which each of the sensing apparatuses employs a common data processing means and a common A/D converter.

21. The apparatus of claim 17, also including transport means for transporting documents past a plurality of sensing locations and further including a plurality of sensing apparatuses for sensing the passage of documents past each sensing location, and in which each of the sensing apparatuses employs a common data processing means and a common A/D converter.

* * * * *